(12) United States Patent
Mandil et al.

(10) Patent No.: US 9,949,161 B2
(45) Date of Patent: Apr. 17, 2018

(54) TECHNIQUES AND APPARATUSES FOR VIRTUAL RADIO LINK MONITORING DURING CARRIER AGGREGATION AND CROSS-CARRIER SCHEDULING

(71) Applicant: QUALCOMM Incorporated, San Diego, CA (US)

(72) Inventors: Amit Mandil, Hyderabad (IN); Amir Aminzadeh Gohari, Sunnyvale, CA (US); Won-Joon Choi, San Diego, CA (US); Hongbo Yan, Vista, CA (US); Rebecca Wen-Ling Yuan, San Diego, CA (US); Leena Zacharias, San Jose, CA (US); Antriksh Pany, San Diego, CA (US); Sarabjot Singh Khangura, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 14/925,700

(22) Filed: Oct. 28, 2015

(65) Prior Publication Data

US 2017/0034840 A1  Feb. 2, 2017

(30) Foreign Application Priority Data

Jul. 31, 2015 (IN) .......................... 2894/MUM/2015

(51) Int. Cl.
*H04W 72/12* (2009.01)
*H04W 24/10* (2009.01)
*H04L 5/00* (2006.01)

(52) U.S. Cl.
CPC ............. *H04W 24/10* (2013.01); *H04L 5/001* (2013.01); *H04L 5/006* (2013.01);
(Continued)

(58) Field of Classification Search
CPC ............. H04W 72/12; H04W 72/1205; H04W 72/1263; H04W 74/00; H04W 74/04; H04W 72/1231; H04W 24/10
See application file for complete search history.

(56) References Cited

U.S. PATENT DOCUMENTS 8,917,605 B2   12/2014  Pelletier et al.
9,042,315 B2    5/2015  Lin et al.
(Continued)

FOREIGN PATENT DOCUMENTS

WO    WO-2012023839 A2    2/2012

OTHER PUBLICATIONS

Ericsson: "Phase I: Event Triggered Reporting Tests on deactivated SCells in non-DRX," 3GPP Draft; R4-151298 Phase-I 3 DL Tests 1-2, 3rd Generation Partnership Project (3GPP), Mobile Competence Centre; 650, Route Des Lucioles; F-06921 Sophia-Antipolis Cedex; France, vol. RAN WG4, No. Rio de Janeiro, Brazil; Apr. 20, 2015-Apr. 24, 2015, Apr. 13, 2015, XP050955948, Retrieved from the Internet: URL: http://www.3gpp.org/ftp/tsg_ran/WG4_Radio/TSGR4_74bis/Docs/ [retrieved on Apr. 13, 2015] sections I-IV.
(Continued)

*Primary Examiner* — Ashley Shivers
(74) *Attorney, Agent, or Firm* — Patterson & Sheridan, L.L.P.

(57) ABSTRACT

Certain aspects of the present disclosure generally relate to wireless communications. In some aspects, a wireless communication device may determine that the wireless communication device is configured to use a primary component carrier (PCC), a first secondary component carrier (SCC), and a second SCC for carrier aggregation. A primary cell may be associated with the PCC, a first secondary cell may be associated with the first SCC, and a second secondary cell may be associated with the second SCC. The first secondary
(Continued)

cell may provide control information for the second secondary cell. The wireless communication device may monitor at least one of the first SCC or the second SCC. The wireless communication device may perform an action associated with the second secondary cell based, at least in part, on monitoring the at least one the first SCC or the second SCC.

25 Claims, 15 Drawing Sheets

(52) U.S. Cl.
CPC ... *H04W 72/1205* (2013.01); *H04W 72/1231* (2013.01); *H04W 72/1263* (2013.01); *H04L 5/0098* (2013.01); *H04W 72/1289* (2013.01)

(56) References Cited

U.S. PATENT DOCUMENTS

| | | |
|---|---|---|
| 2013/0136006 A1 | 5/2013 | Kim et al. |
| 2013/0201834 A1 | 8/2013 | Klingenbrunn et al. |
| 2013/0242819 A1* | 9/2013 | He .................. H04W 28/0268 370/280 |
| 2014/0003356 A1 | 1/2014 | Wang et al. |
| 2014/0274030 A1 | 9/2014 | Aminzadeh et al. |
| 2015/0063259 A1 | 3/2015 | Gohari et al. |

OTHER PUBLICATIONS

International Search Report and Written Opinion—PCT/US2015/057989—ISA/EPO—dated Apr. 1, 2016.

* cited by examiner

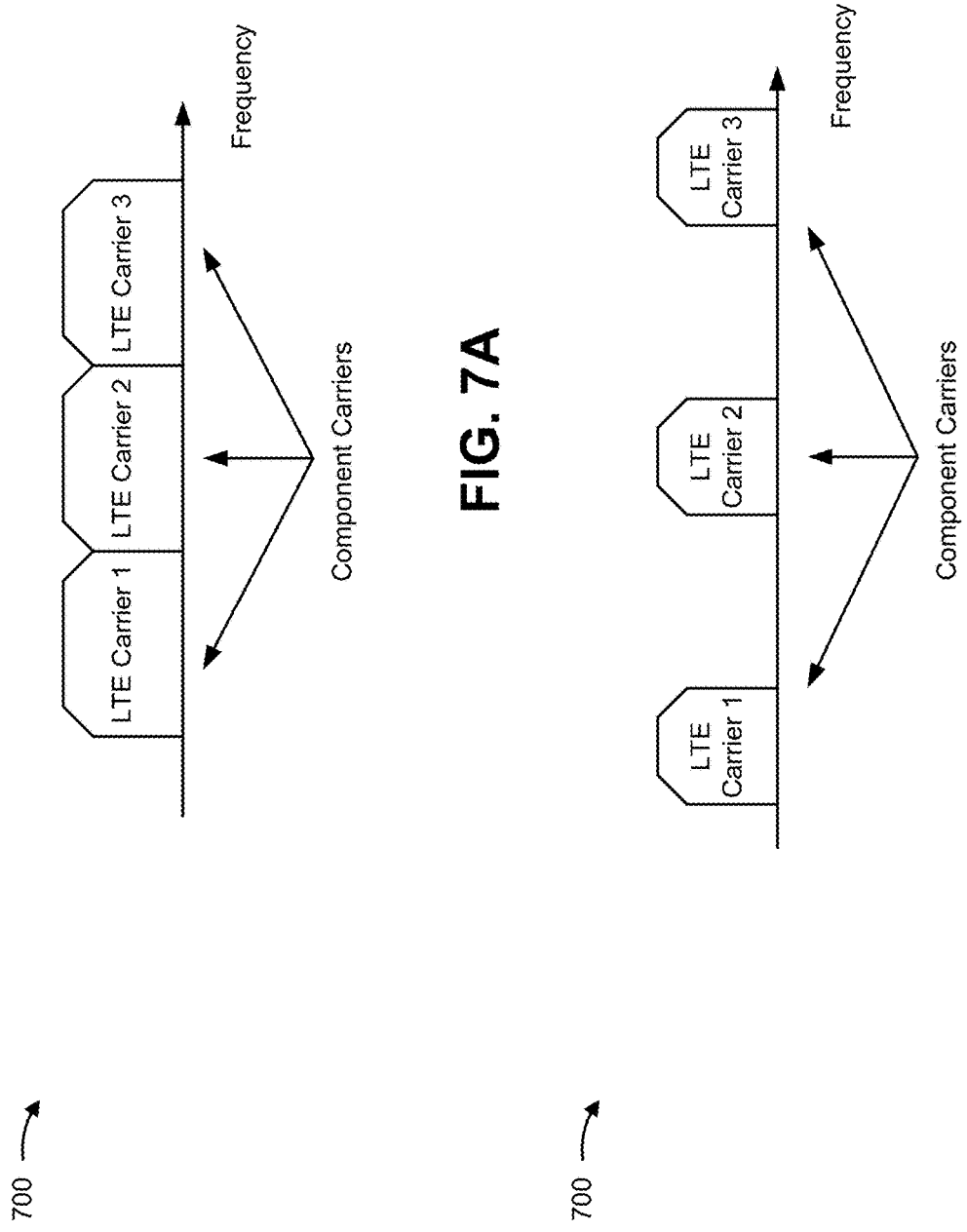

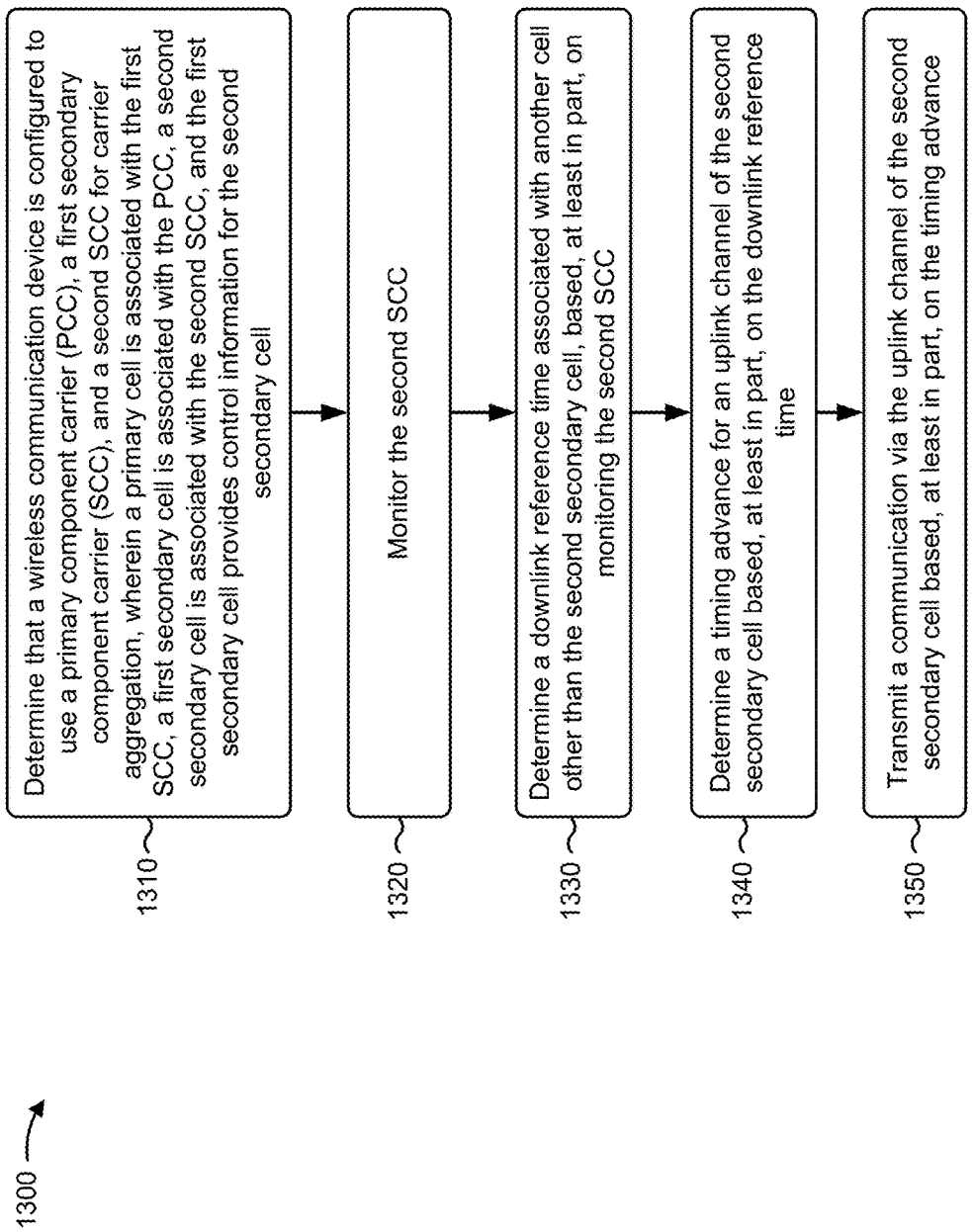

TECHNIQUES AND APPARATUSES FOR VIRTUAL RADIO LINK MONITORING DURING CARRIER AGGREGATION AND CROSS-CARRIER SCHEDULING

CROSS-REFERENCE TO RELATED APPLICATION UNDER 35 U.S.C. § 119

This application claims priority to Indian Provisional Patent Application No. 2894/MUM/2015, filed on Jul. 31, 2015, entitled "TECHNIQUES AND APPARATUSES FOR VIRTUAL RADIO LINK MONITORING DURING CARRIER AGGREGATION AND CROSS-CARRIER SCHEDULING," which is hereby expressly incorporated by reference herein.

FIELD OF THE DISCLOSURE

Aspects of the present disclosure generally relate to wireless communications, and more particularly to techniques and apparatuses for virtual radio link monitoring during carrier aggregation and cross-carrier scheduling.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication may include determining, by a wireless communication device, that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information (e.g., scheduling information) for the second secondary cell. The method may include monitoring, by the wireless communication device, at least one of the first SCC or the second SCC (e.g., for at least one of a signal quality associated with the first SCC or the second SCC, or a tune-away associated with the first SCC or the second SCC). The method may include performing, by the wireless communication device, an action associated with the second secondary cell based, at least in part, on monitoring the at least one of the first SCC or the second SCC.

In some aspects, a wireless communication device for wireless communication may include one or more processors configured to determine that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information (e.g., scheduling information) for the second secondary cell. The one or more processors may be configured to monitor at least one of the first SCC or the second SCC (e.g., for at least one of a signal quality associated with the first SCC or the second SCC, or a tune-away associated with the first SCC or the second SCC). The one or more processors may be configured to perform an action associated with the second secondary cell based, at least in part, on monitoring the at least one of the first SCC or the second SCC.

In some aspects, a non-transitory computer-readable medium may store instructions for wireless communication. The instructions may include one or more instructions that, when executed by one or more processors of a wireless communication device, cause the one or more processors to determine that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information (e.g., scheduling information) for the second secondary cell. The one or more instructions may cause the one or more processors to monitor at least one of the first SCC or the second SCC (e.g., for at least one of a signal quality associated with the first SCC or the second SCC, or a tune-away associated with the first SCC or the second SCC). The one or more instructions may cause the one or more processors to perform an action associated with the second secondary cell based, at least in part, on monitoring the at least one of the first SCC or the second SCC.

In some aspects, an apparatus for wireless communication may include means for determining that the apparatus is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information (e.g., scheduling information) for the second secondary cell. The apparatus may include means for monitoring at least one of the first SCC or the second SCC (e.g., for at least one of a signal quality associated with the first SCC or the second SCC, or a tune-away associated with the first SCC or the second SCC). The apparatus may include means for performing an action associated with the second secondary cell based, at least in part, on monitoring the at least one of the first SCC or the second SCC.

Aspects generally include a method, apparatus, system, computer program product, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating example carrier aggregation types, in accordance with various aspects of the present disclosure.

FIG. 13 is a diagram illustrating another example process performed, for example, by a wireless communication device, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
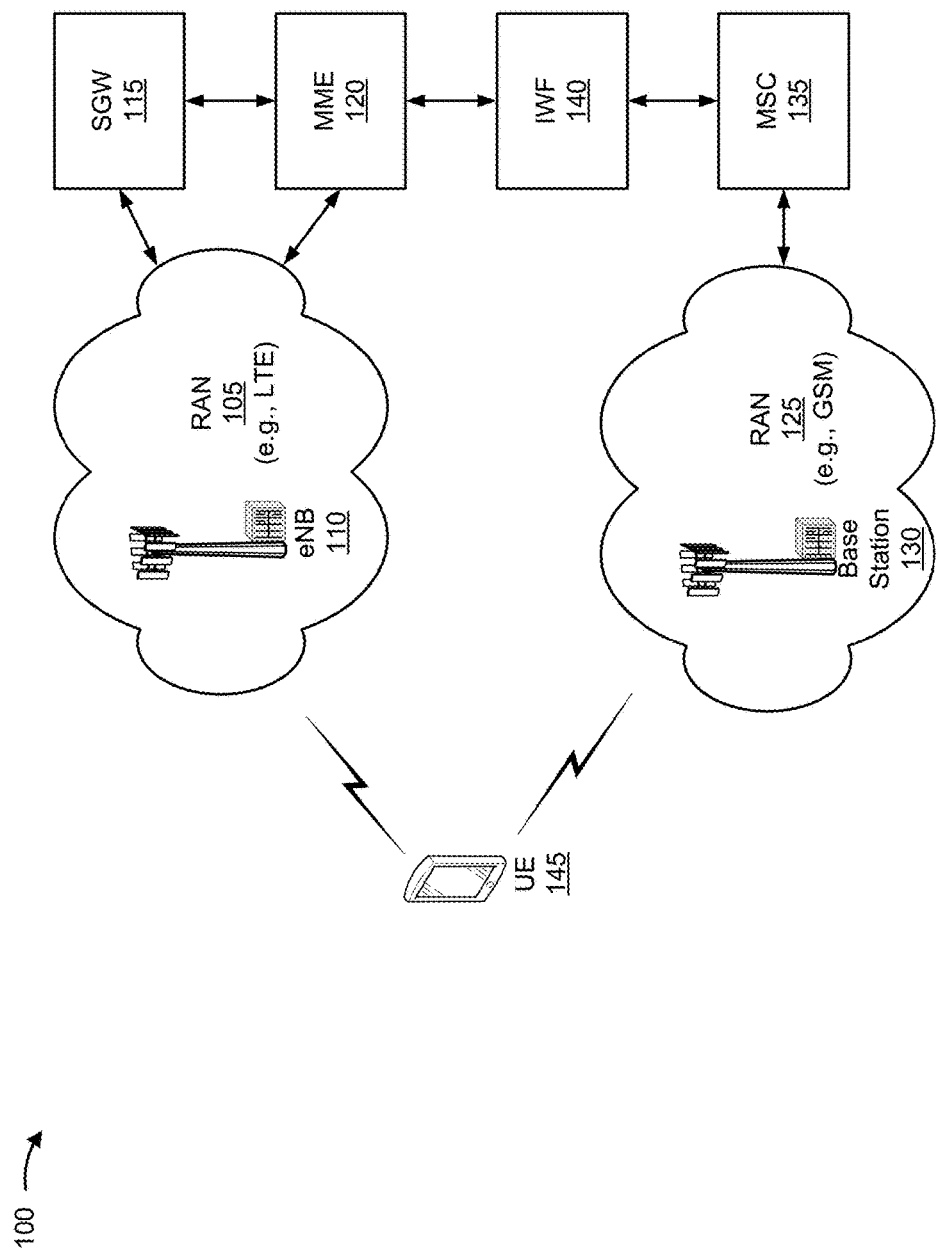
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipments (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145.

In general, any number of wireless networks may be deployed in a given geographic area. Each wireless network may support a particular RAT and may operate on one or more frequencies. A RAT may also be referred to as a radio technology, an air interface, etc. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, etc.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
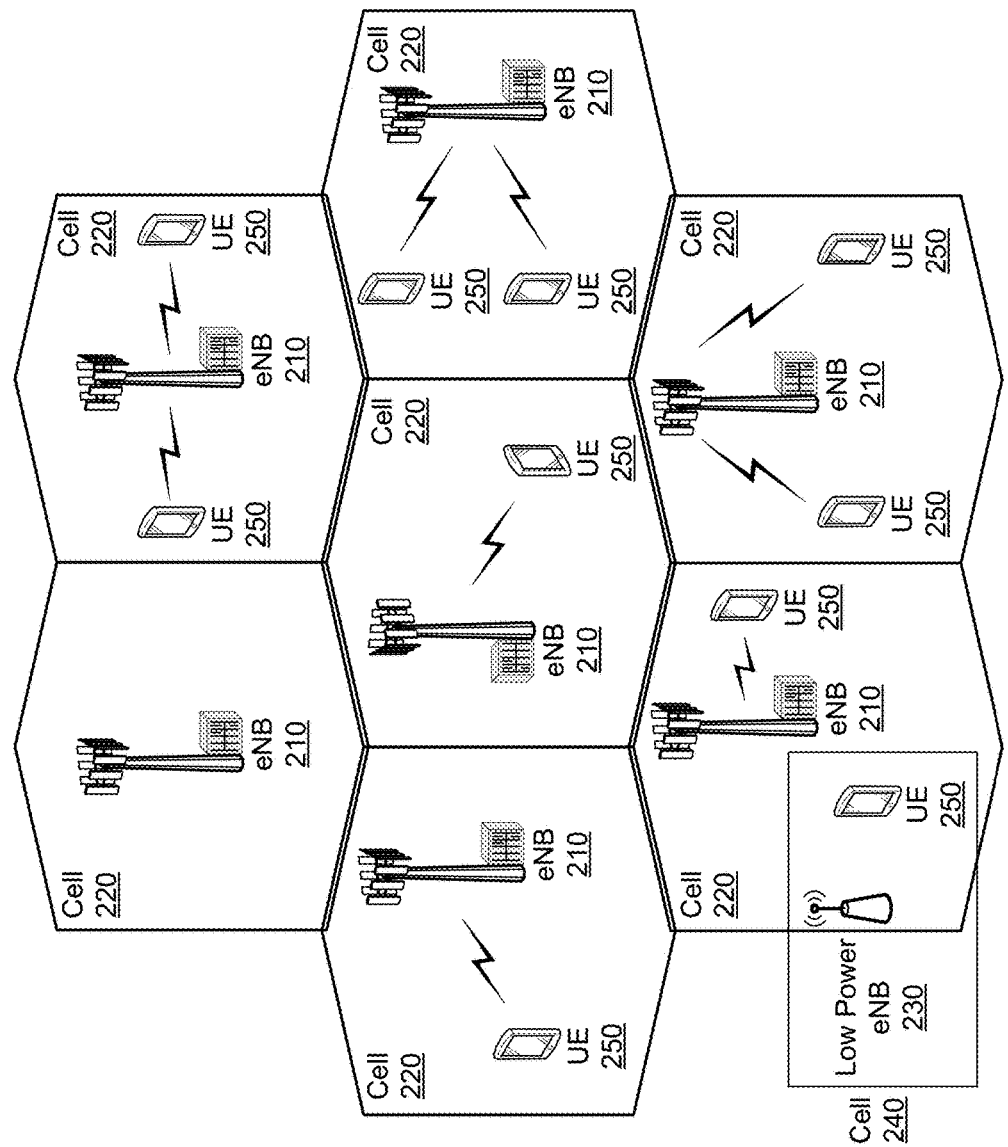
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
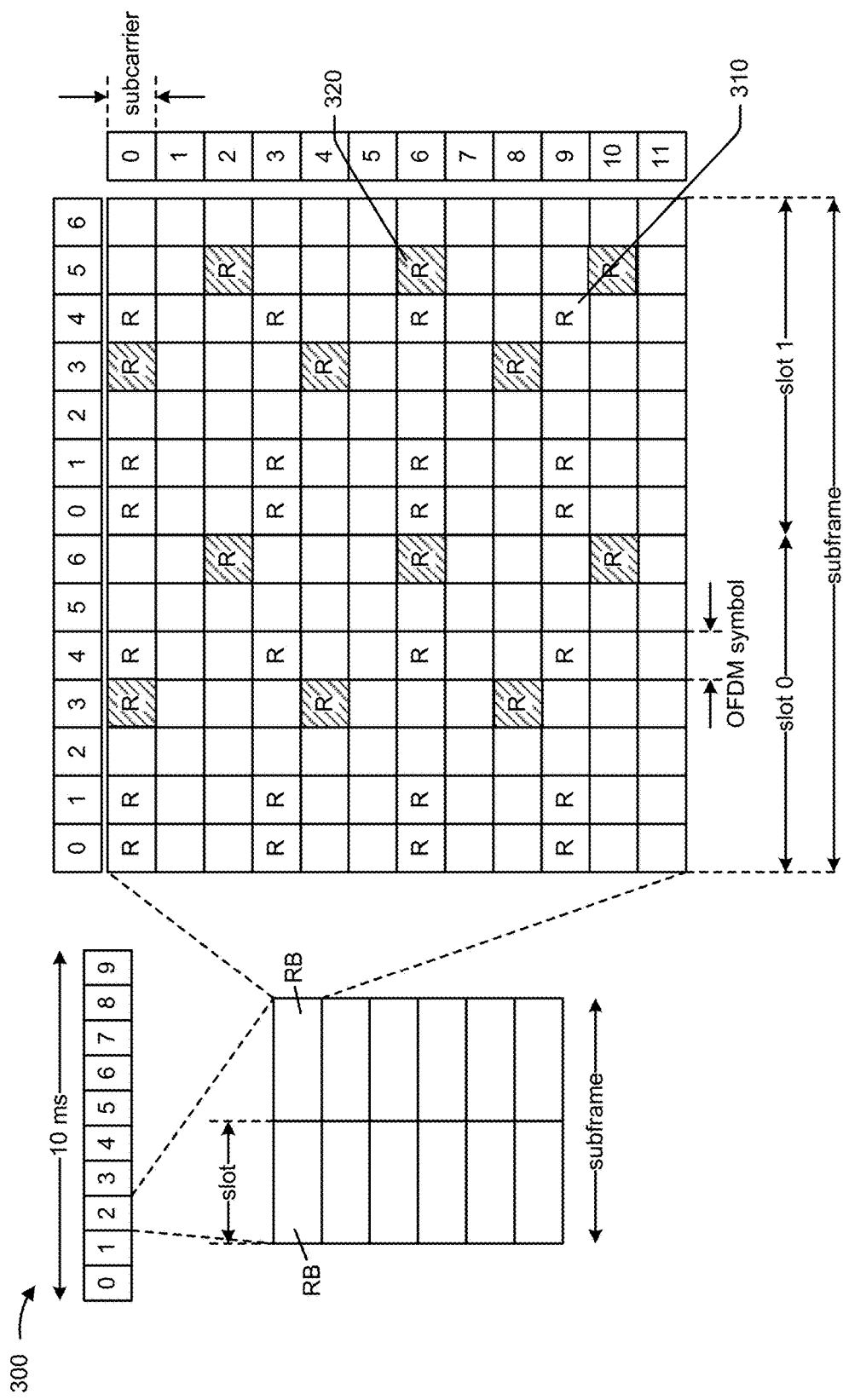
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
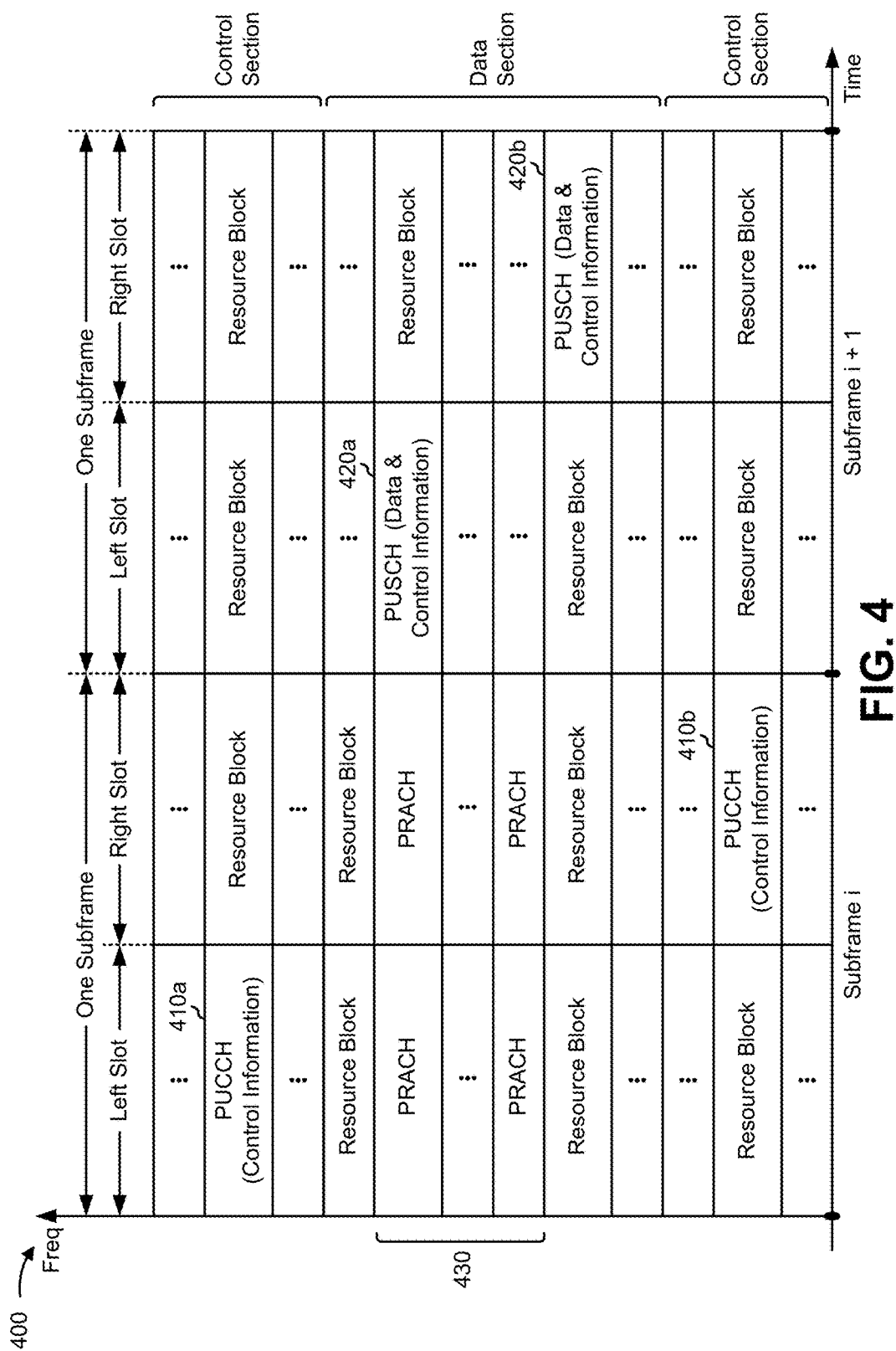
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
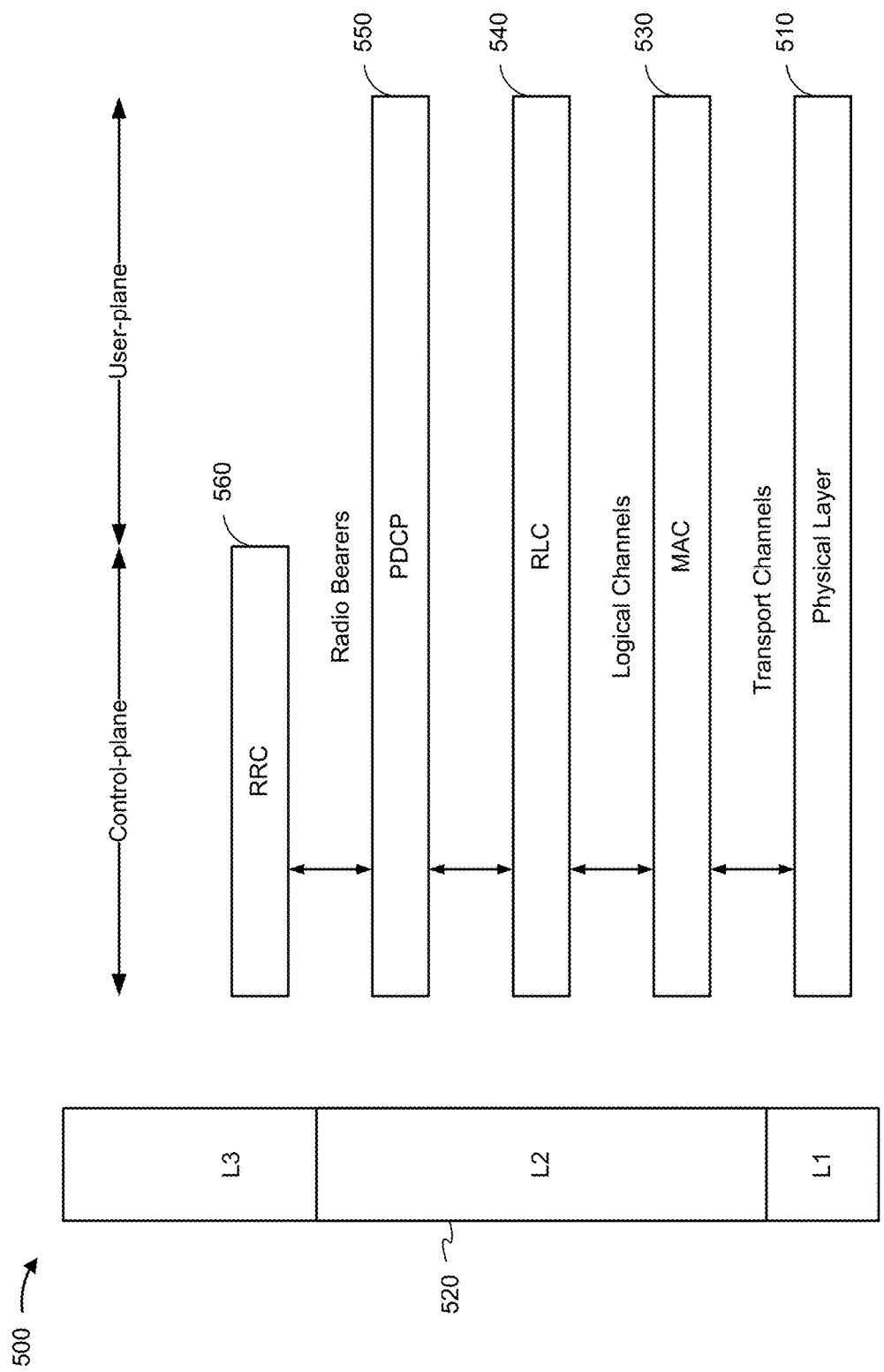
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes a media access control (MAC) sublayer 530, a radio link control (RLC) sublayer 540, and a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
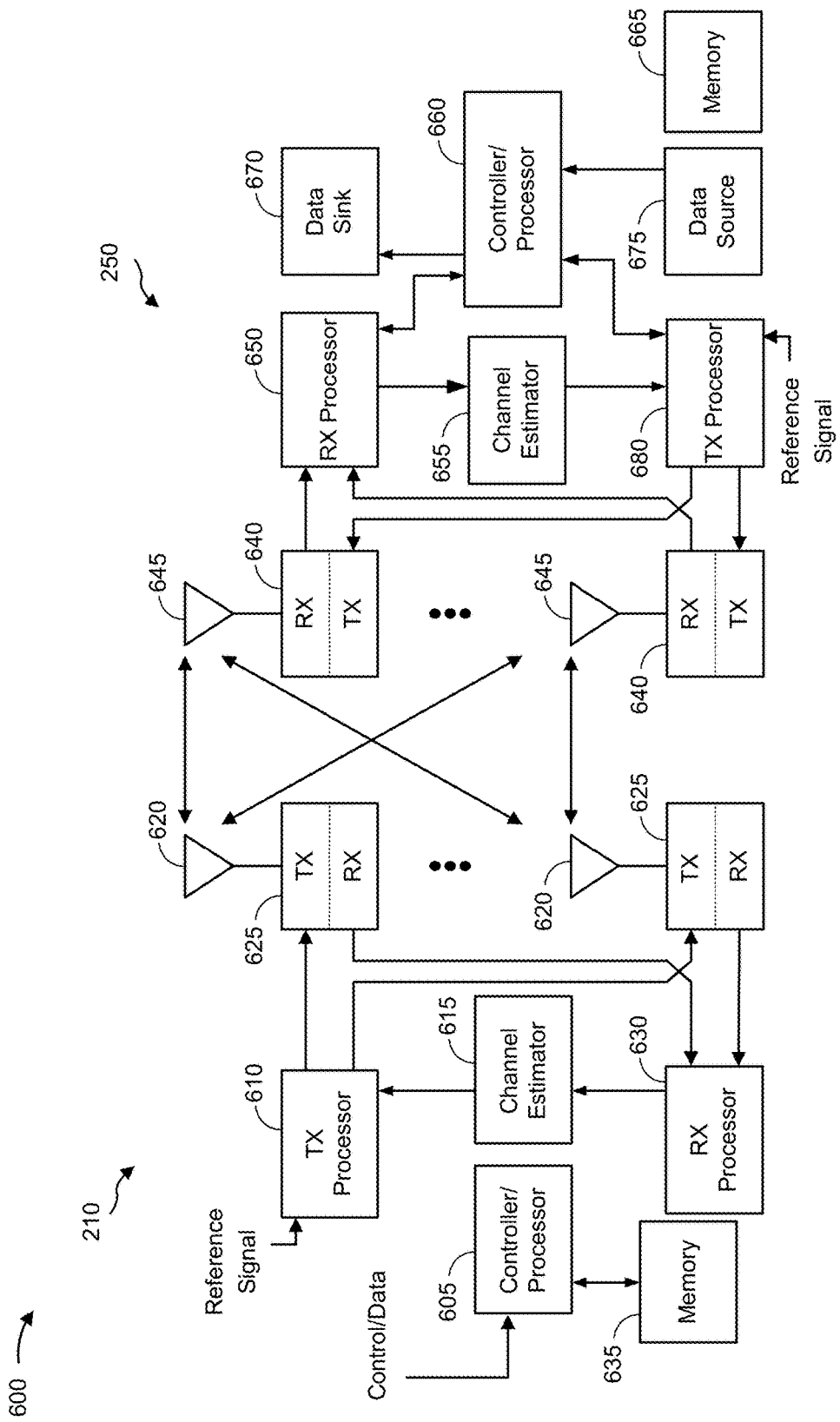
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to perform virtual radio link monitoring during carrier aggregation and cross-carrier scheduling, as described in more detail elsewhere herein. For example, the controller/processor 660 and/or other processors and modules of UE 145, 250 may perform or direct operations of, for example, process 1100 of FIG. 11, process 1200 of FIG. 12, process 1300 of FIG. 13, and/or other processes as described herein. In some aspects, one or more of the components shown in FIG. 6 may be employed to perform example process 1100, example process 1200, example process 1300, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

FIGS. 7A and 7B are illustrations of examples 700 of carrier aggregation types, in accordance with various aspects of the present disclosure.

In some aspects, UE 145, 250 may use spectrum of up to 20 MHz bandwidths allocated in a carrier aggregation of up to a total of 100 MHz (e.g., 5 component carriers) used for transmission and reception. For an LTE-Advanced enabled wireless communication system, two types of carrier aggregation (CA) methods may be used, contiguous CA and non-contiguous CA, which are illustrated in FIGS. 7A and 7B, respectively. Contiguous CA occurs when multiple available component carriers are adjacent to each other (e.g., as illustrated in FIG. 7A). On the other hand, non-contiguous CA occurs when multiple non-adjacent available component carriers are separated along the frequency band (e.g., as illustrated in FIG. 7B) and/or are included in different frequency bands.

Both non-contiguous and contiguous CA may aggregate multiple component carriers to serve a single unit of LTE-Advanced UEs 145, 250. In various examples, UE 145, 250 operating in a multicarrier system (e.g., also referred to as carrier aggregation) is configured to aggregate certain functions of multiple carriers, such as control and feedback functions, on the same carrier, which may be referred to as a primary carrier. The remaining carriers that depend on the primary carrier for support may be referred to as secondary carriers. For example, UE 145, 250 may aggregate control functions such as those provided by the optional dedicated channel (DCH), the nonscheduled grants, a physical uplink control channel (PUCCH), and/or a physical downlink control channel (PDCCH).

As indicated above, FIGS. 7A and 7B are provided as examples. Other examples are possible and may differ from what was described in connection with FIGS. 7A and 7B.

Figure 8A:
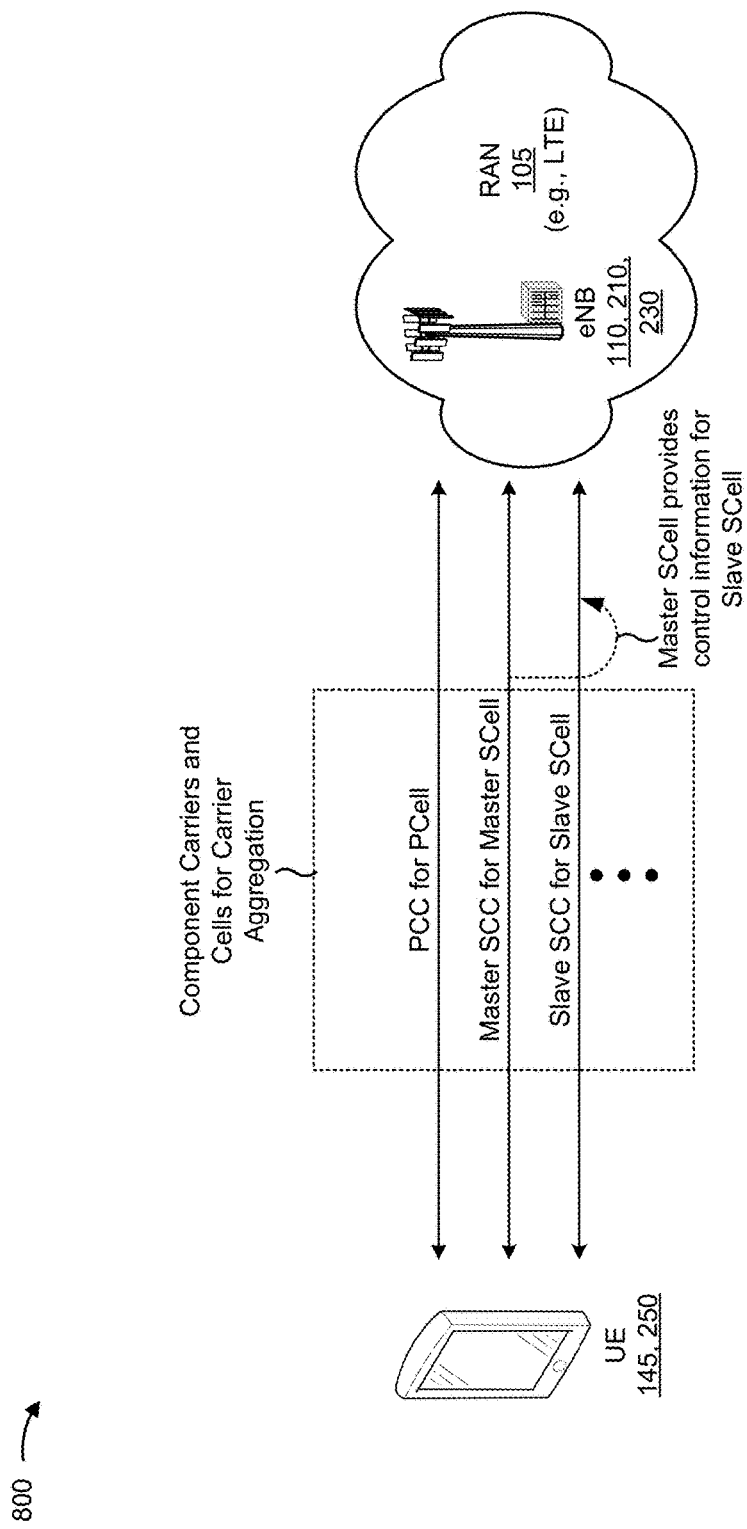
FIGS. 8A-8C are diagrams illustrating an example of virtual radio link monitoring during carrier aggregation and cross-carrier scheduling, in accordance with various aspects of the present disclosure.
Figure 8B:
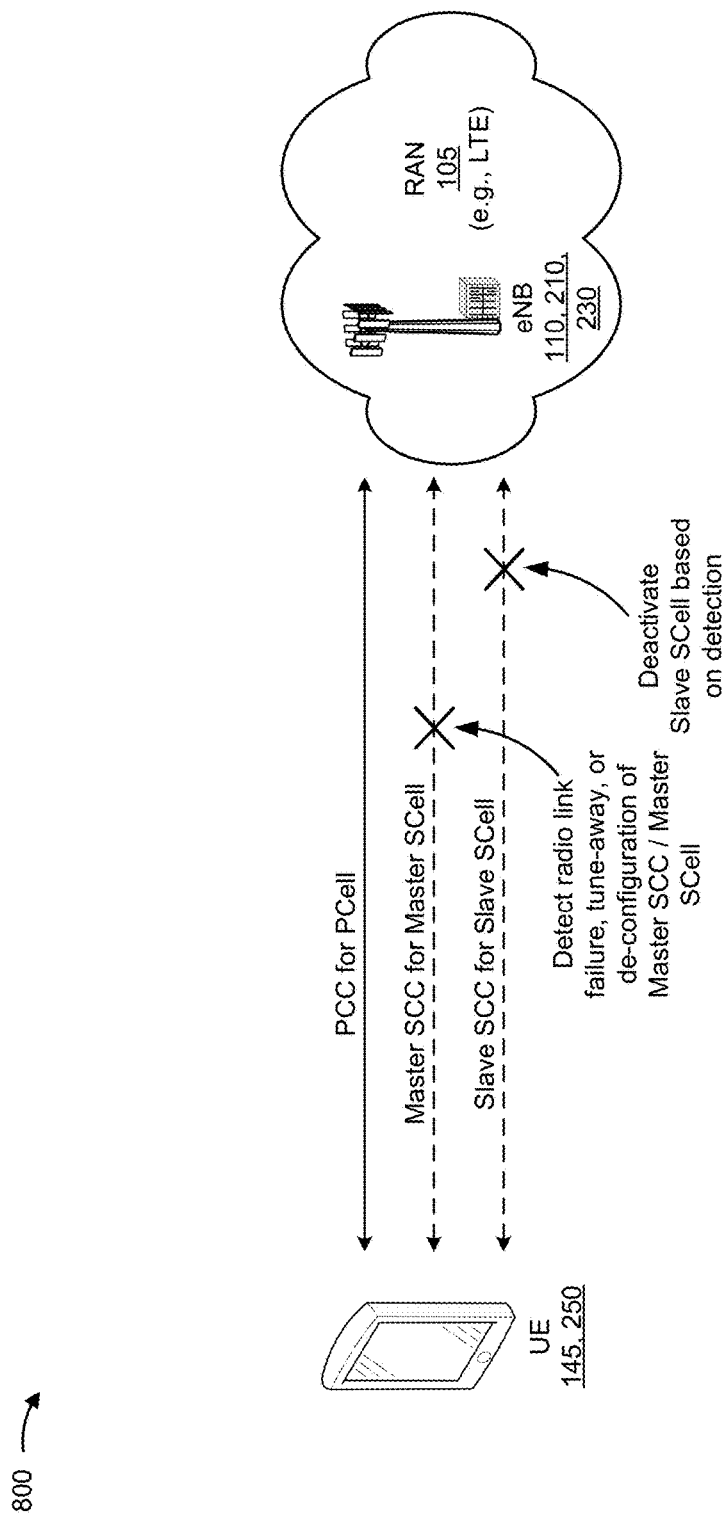
Figure 8C:
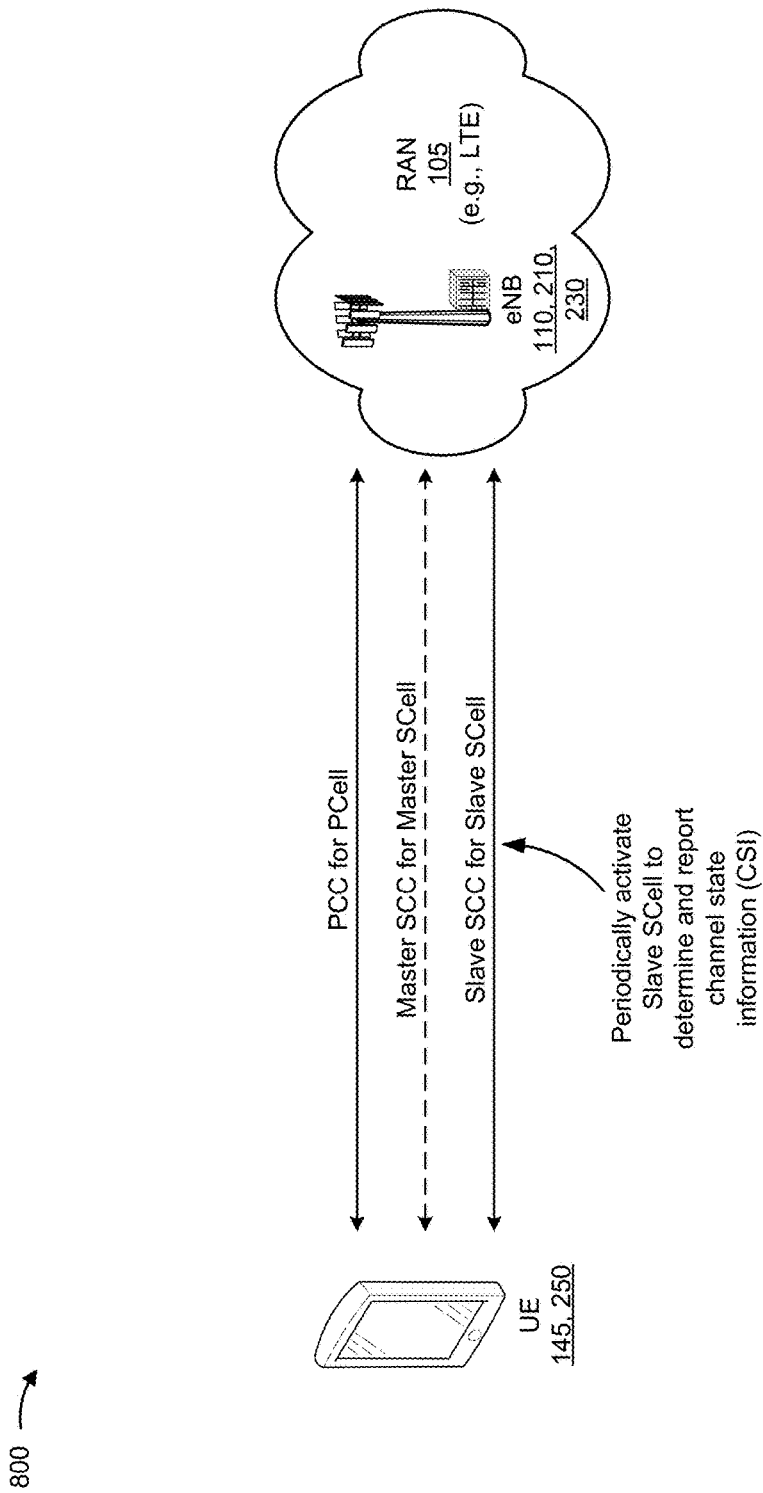

FIGS. 8A-8C are diagrams illustrating an example 800 of virtual radio link monitoring during carrier aggregation and cross-carrier scheduling, in accordance with various aspects of the present disclosure. As shown in FIG. 8A, UE 145, 250 communicates with eNB 110, 210, 230 using three component carriers, corresponding to three cells, for carrier aggregation. The first component carrier is shown as a primary component carrier (PCC), and is associated with a primary cell ("PCell"). The second component carrier is a first secondary component carrier (SCC), and is associated with a first secondary cell ("SCell"). The first SCC is shown as a master SCC, and the first SCell is shown as a master SCell. The third component carrier is a second SCC, and is associated with a second SCell. The second SCC is shown as a slave SCC, and the second SCell is shown as a slave SCell.

As further shown in FIG. 8A, the master SCell provides control information for the slave SCell. For example, UE 145, 250 and eNB 110, 210, 230 may use cross-carrier scheduling, where the master SCell schedules uplink grants and/or downlink grants for the slave SCell. Additionally, or alternatively, the master SCell may provide other control information for the slave SCell (e.g., via a PDCCH associated with the master SCell, a PUCCH associated with the master SCell, etc.). In this configuration, if the master SCell is unavailable (e.g., due to poor signal quality, tune-away from the master SCC, de-configuration of the master SCell, and/or the like) then control information for the slave SCell may not be reliably received by UE 145, 250. Thus, UE 145, 250 may waste resources (e.g., battery power, network resources, etc.) by maintaining the slave SCell in the active state. Techniques and apparatuses described herein conserve resources by deactivating the slave SCell when the master SCell cannot provide (e.g., or reliably provide) control information for the slave SCell.

The number of component carriers and cells shown in FIG. 8A are provided as an example. In some aspects, UE 145, 250 and eNB 110, 210, 230 may use additional component carriers and/or cells to communicate via carrier aggregation (e.g., four component carriers corresponding to four cells, five component carriers corresponding to five cells, etc.). Additionally, or alternatively, the master SCell may provide control information for multiple slave SCell (e.g., two slave SCells, three slave SCells, etc.). In this case, the operations described herein in association with a slave SCell may apply to multiple slave SCells for which the master SCell provides control information.

As shown in FIG. 8B, UE 145, 250 may monitor the master SCC. For example, UE 145, 250 may monitor the master SCC to determine radio link conditions associated with the master SCC, to detect whether UE 145, 250 has tuned away from the master SCC, to detect whether eNB 110, 210, 230 has de-configured the master SCell, or the like. Based, at least in part, on monitoring the master SCC, UE 145, 250 may perform an action associated with the slave SCell, such as deactivating the slave SCell when the master SCC experiences a radio link failure, when UE 145, 250 tunes away from the master SCC, when the master SCell has been de-configured, when the master SCall has been deactivated, and/or the like. In this way, UE 145, 250 may perform virtual radio link monitoring for the slave SCell (e.g., by monitoring, for example, the master SCC to determine actions to perform for the slave SCell).

By deactivating the slave SCell based, at least in part, on monitoring the master SCC, UE 145, 250 may conserve processing resources, network resources, battery power, and/or the like. For example, if UE 145, 250 detects that control information for the slave SCell can no longer be received (e.g., or reliably received) via the master SCell, then UE 145, 250 may be unable to communicate with eNB 110, 210, 230 via the slave SCell. In this case, if the slave SCell remains active, UE 145, 250 may waste resources and/or power by maintaining an unusable slave SCell in an active state. By deactivating the slave SCell, UE 145, 250 may conserve these resources and/or power.

In some aspects, UE 145, 250 may deactivate the slave SCell by turning off wideband processing for the slave SCell. Additionally, or alternatively, UE 145, 250 may deactivate the slave SCell by turning off monitoring of one or more channels (e.g., PDCCH, PDSCH, etc.) of the slave SCell. Additionally, or alternatively, UE 145, 250 may deactivate the slave SCell by turning off communication transmissions on an uplink channel of the slave SCell. Additionally, or alternatively, UE 145, 250 may deactivate the slave SCell by turning off reporting of channel state information. In some aspects, when the slave SCell is deactivated, UE 145, 250 may not perform any actions associated with the slave SCell except for measuring (e.g., periodically measuring) select signal quality parameters, such as, for example, reference signal parameters (e.g., a reference signal received power (RSRP) parameter, a reference signal received quality (RSRQ) parameter, etc.) associated with the slave SCell for an eNB and/or neighbor eNBs.

In some aspects, UE 145, 250 may detect a radio link failure associated with the master SCC, and may deactivate the slave SCell associated with the slave SCC based, at least in part, on detecting the radio link failure. For example, UE 145, 250 may monitor a signal quality associated with the master SCC (e.g., based, at least in part, on a signal-to-interference-plus-noise ratio (SINR) parameter, a reference signal received power (RSRP) parameter, a reference signal received quality (RSRQ) parameter, and/or the like). If UE 145, 250 determines that the signal quality does not satisfy a threshold (e.g., is below a threshold), then UE 145, 250 may detect a radio link failure associated with the master SCC. In some aspects, UE 145, 250 may detect a radio link failure associated with the master SCC if the signal quality does not satisfy the threshold for a threshold period of time (e.g., for two consecutive signal quality measurements, for three consecutive signal quality measurements, etc.). In some aspects, based, at least in part, on detecting the radio link failure of the master SCC and/or detecting that the signal quality does not satisfy the threshold, UE 145, 250 may deactivate the slave SCell since UE 145, 250 can no longer reliably receive control information for the slave SCell via the master SCell.

In some aspects, UE 145, 250 may detect that UE 145, 250 has tuned away from the master SCC, and may deactivate the slave SCell based, at least in part, on detecting that UE 145, 250 has tuned away from the master SCC. For example, UE 145, 250 may be a multi-subscriber identification module (SIM) UE and/or a multi-standby UE that enables concurrent communication on multiple subscriptions using a shared RF chain. In this case, UE 145, 250 may be capable of switching the master SCell from a first channel (e.g., frequency) to a second channel (e.g., frequency) for communications. UE 145, 250 may monitor the master SCC to detect such tune-away from the first channel (e.g., the master SCC) to the second channel on the master SCell. If UE 145, 250 detects that UE 145, 250 has tuned away from the master SCC, then UE 145, 250 may deactivate the slave SCell since UE 145, 250 can no longer receive control information for the slave SCell via the master SCell.

In some aspects, UE 145, 250 may determine that the master SCell has been de-configured or deactivated, and may deactivate the slave SCell based, at least in part, on determining that the master SCell has been de-configured or deactivated. For example, eNB 110, 210, 230 may de-configure the master SCell such that the master SCell is no longer configured to provide control information for other cells. In this case, UE 145, 250 may monitor the master SCell (e.g., by monitoring the associated master SCC) to determine whether the master SCell has been de-configured or deactivated. If UE 145, 250 detects that the master SCell has been de-configured or deactivated, then, in some aspects, UE 145, 250 may deactivate the slave SCell since UE 145, 250 can no longer receive control information for the slave SCell via the master SCell.

As shown in FIG. 8C, after deactivating the slave SCell, UE 145, 250 may periodically activate the slave SCell to determine and report channel state information (CSI). UE 145, 250 may report the CSI to eNB 110, 210, 230 so that eNB 110, 210, 230 has accurate information regarding the radio conditions of the slave SCell. In some aspects, eNB 110, 210, 230 may use the CSI to re-configure E-UTRAN 105 (e.g., component carriers and/or cells) associated with carrier aggregation and/or cross-carrier scheduling. For example, if the master SCell experiences a radio link failure, UE 145, 250 may report a channel quality indicator (CQI) value of zero for the master SCell. Additionally, or alternatively, UE 145, 250 may periodically report CQI values for the slave SCell. The eNB 110, 210, 230 may use CQI values for different cells to configure the network. In some aspects, the CSI may include a CQI value, a precoding matrix indicator (PMI) value, a rank indicator (RI) value, and/or the like.

In some aspects, UE 145, 250 may activate the slave SCell by, for example, turning on wideband processing, turning on monitoring of one or more channels (e.g., PDCCH, PDSCH, etc.) of the slave SCell, turning on communication transmissions on an uplink channel of the slave SCell, turning on reporting of channel state information, and/or the like.

In some aspects, UE 145, 250 may monitor the master SCC, and may deactivate the slave SCell (e.g., associated with the slave SCC) during a first time period based, at least in part, on monitoring the master SCC. UE 145, 250 may then activate the slave SCell during a second time period that occurs after the first time period. UE 145, 250 may determine CSI, associated with the slave SCell, based, at least in part, on activating the slave SCell during the second time period. For example, UE 145, 250 may measure the CSI during the second time period, and may report the measured CSI to eNB 110, 210, 230. After measuring the CSI, UE 145, 250 may deactivate the slave SCell during a third time period that occurs after the second time period. In this way, UE 145, 250 may report CSI that may be useful to eNB 110, 210, 230 to avoid throughput loss, and that may avoid penalizing UE 145, 250 (e.g., by disconnecting and reestablishing a connection associated with UE 145, 250) for failing to report CSI (e.g., when the master SCC experiences a radio link failure, when UE 145, 250 tunes away from the master SCC, when the master SCell has been de-configured, when the master SCell has been deactivated, and/or the like).

In some aspects, such as when UE 145, 250 has tuned away from the master SCC, UE 145, 250 may activate the slave SCell based, at least in part, on determining that a tune-away time period satisfies a tune-away threshold. The tune-away time period may be a time period during which UE 145, 250 is tuned away from the master SCC. If UE 145, 250 has been tuned away from the master SCC for a tune-away time period that satisfies a tune-away threshold (e.g., 1 second, 10 seconds, 1 minute, etc.), then UE 145, 250 may activate the slave SCell to determine and report the CSI associated with the slave SCell. In this way, UE 145, 250 may avoid being penalized for a failure to report CSI for the slave SCell.

In some aspects, UE 145, 250 may report old CSI, measured during a prior time period, to avoid activating the slave SCell during a current time period, thereby conserving additional resources and/or power. Details of reporting old CSI are provided in more detail below in connection with FIG. 9.

As indicated above, FIGS. 8A-8C are provided as examples. Other examples are possible and may differ from what was described with respect to FIGS. 8A-8C.

Figure 9:
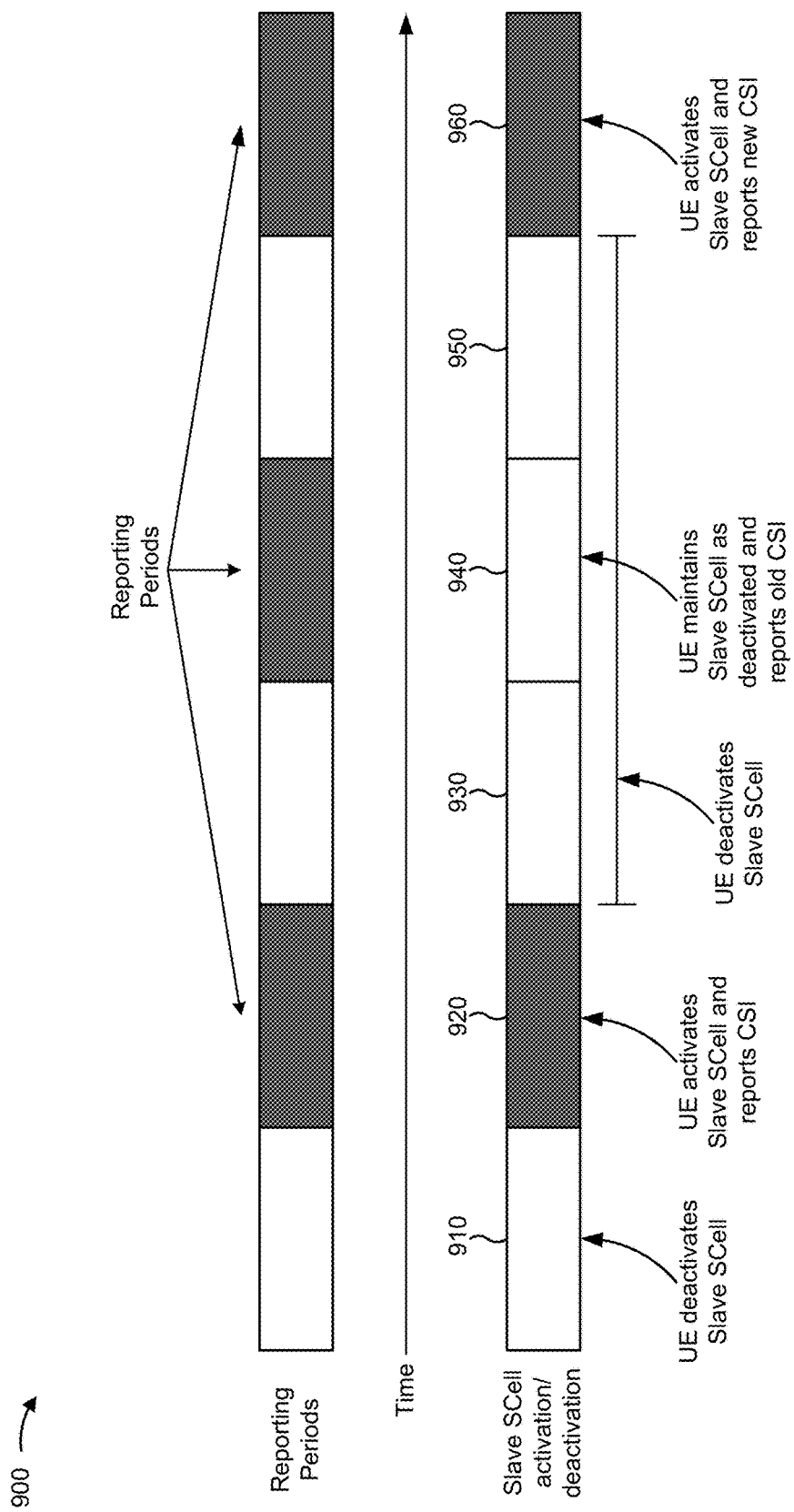
FIG. 9 is a diagram illustrating an example of periodically activating a slave secondary cell to determine channel state information, in accordance with various aspects of the present disclosure.

FIG. 9 is a diagram illustrating an example 900 of periodically activating a slave secondary cell to determine channel state information, in accordance with various aspects of the present disclosure.

As shown in FIG. 9, a UE 145, 250 may deactivate a slave SCell during a first time period 910, as described above in connection with FIGS. 8A-8C. As further shown, the UE 145, 250 may activate the slave SCell for communication, for example, to measure CSI, associated with the slave SCell, during a second time period 920, and to report the CSI to an eNB. The second time period 920 may correspond to a reporting period during which the UE 145, 250 is expected to report the CSI to the eNB. During a third time period 930, the UE 145, 250 may deactivate the slave SCell, and may maintain the slave SCell in a deactivated state during the third time period 930, a fourth time period 940, and a fifth time period 950.

As shown, the fourth time period 940 may correspond to a reporting period during which the UE 145, 250 is expected to report the CSI, associated with the slave SCell, to the eNB. In some aspects, the UE 145, 250 may report old CSI, associated with the slave SCell, during the fourth time period 940 so as to conserve resources and/or power by avoiding activating the slave SCell during the fourth time period 940 to measure the CSI. For example, during the fourth time period 940, the UE may report the old CSI, measured during the second time period 920, to the eNB. As shown, the second time period 920 and the fourth time period 940 may correspond to consecutive reporting periods.

As further shown, the UE 145, 250 may activate the slave SCell to measure new CSI during a sixth time period 960, and may report the new CSI to an eNB. In this way, the UE 145, 250 may subsample CSI (e.g., by not measuring the CSI during every reporting period) to conserve resources and/or power. Such subsampling may not have a negative impact on network resources because UE 145, 250 is not receiving communications via the slave SCell, so there are no communications to be negatively impacted. Furthermore, the UE 145, 250 may report CSI to the eNB during every reporting period, and may avoid resource allocation penalties associated with failing to report the CSI.

As indicated above, FIG. 9 is provided as an example. Other examples are possible and may differ from what was described with respect to FIG. 9.

Figure 10:
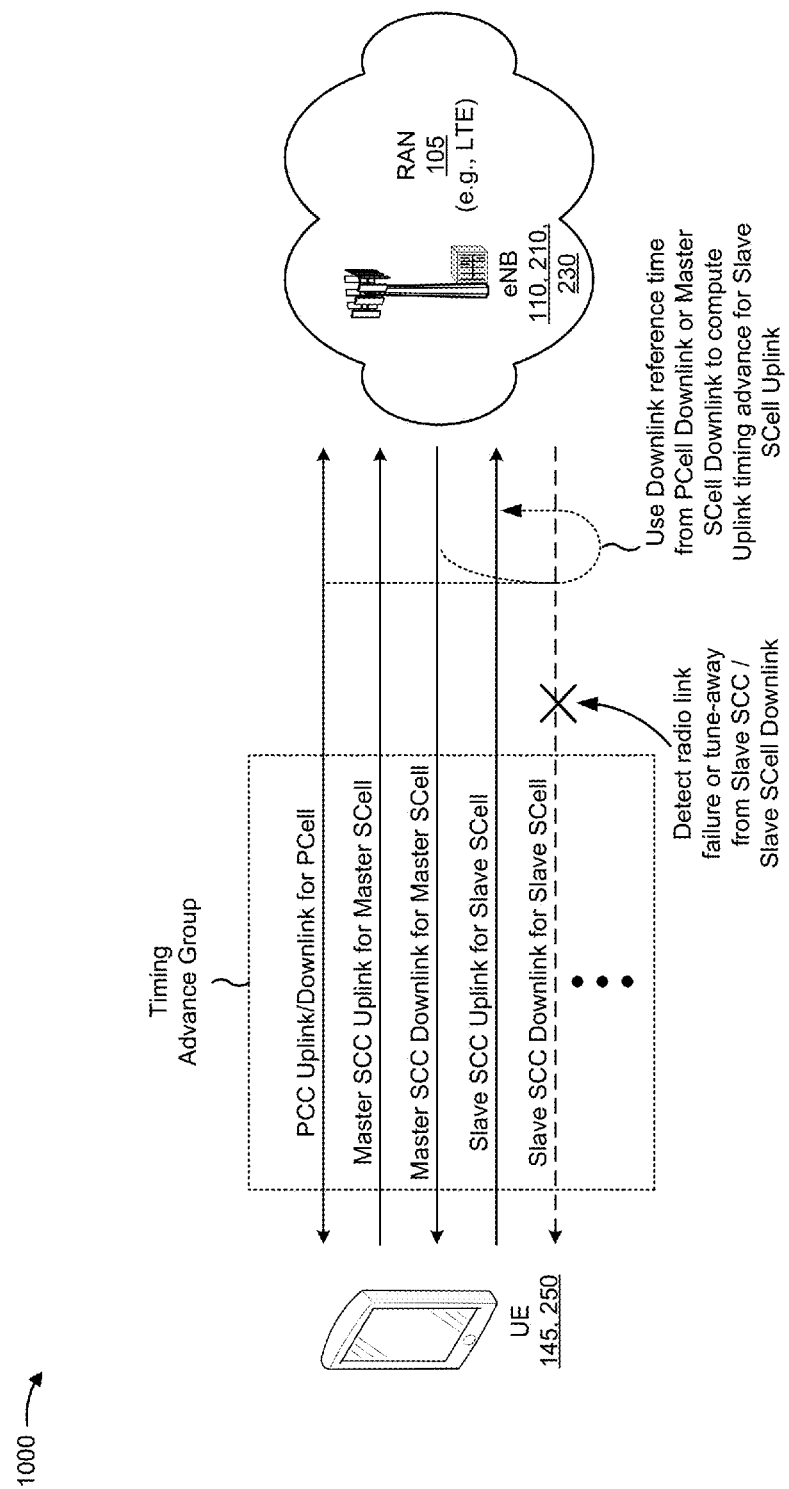
FIG. 10 is a diagram illustrating an example of using a downlink reference time associated with a timing advance group to determine a timing advance for an uplink channel of a slave secondary cell, in accordance with various aspects of the present disclosure.

FIG. 10 is a diagram illustrating an example 1000 of using a downlink reference time associated with a timing advance group to determine a timing advance for an uplink channel of (e.g., associated with a) slave secondary cell, in accordance with various aspects of the present disclosure.

As shown in FIG. 10, UE 145, 250 communicates with eNB 110, 210, 230 using, for example, three component carriers, corresponding to three cells, for carrier aggregation. The first component carrier is shown as a PCC corresponding to a PCell. The PCC and the PCell are associated with an uplink channel (e.g., PUSCH) and a downlink channel (e.g., PDSCH). The second component carrier is a first SCC, shown as a master SCC, corresponding to a first SCell, shown as a master SCell. The master SCC and the master SCell are associated with an uplink channel and/or a downlink channel. The third component carrier is a second SCC, shown as a slave SCC, corresponding to a second SCell, shown as a slave SCell. The slave SCC and the slave SCell are associated with an uplink channel and/or a downlink channel. The master SCell may provide control information for the slave SCell, as described elsewhere herein. In some aspects, UE 145, 250 may receive grants (e.g., UL grants) from the PCell.

As shown, the PCell, the master SCell, and the slave SCell may be part of a timing advance group, for example. For example, UE 145, 250 may use a same timing advance for uplink transmissions for each of these cells. The timing advance may refer to an offset, at UE 145, 250, between the start of a received downlink subframe and a transmitted uplink subframe. The timing advance may be used to ensure that downlink and uplink subframes are synchronized at eNB 110, 210, 230. When multiple cells use a same timing advance, the timing advance for a first cell (e.g., the PCell, the master SCell, etc.) may be used for one or more second cells (e.g., the master SCell, the slave SCell, etc.). In this configuration, UE 145, 250 may utilize the timing advance group to use the uplink channel of the slave SCell for communications, even when the downlink channel of the slave SCell is unavailable or unsuitable, thereby increasing throughput, as described in more detail herein.

In some aspects, UE 145, 250 may monitor the slave SCC, and may perform an action associated with the slave SCell (e.g., associated with the slave SCC) based, at least in part, on monitoring the slave SCC. For example, UE 145, 250 may monitor the downlink channel associated with the slave SCC to detect a radio link failure, a tune-away, and/or the like, on the downlink channel of the slave SCC. In other words, UE 145, 250 may detect that a downlink reference time may not be able to be received (e.g., or reliably received) via the downlink channel of the slave SCell. However, because the slave SCell is part of a timing advance group, UE 145, 250 may use a downlink reference time associated with another cell (e.g., other than the slave SCell) that is included in the timing advance group. For example, UE 145, 250 may determine a downlink reference time associated with the PCell, the master SCell, a different slave SCell, or the like.

Using the downlink reference time associated with the other cell, UE 145, 250 may determine a timing advance for an uplink channel of the slave SCell. UE 145, 250 may transmit one or more communications via the uplink channel of the slave SCell based, at least in part, on the timing advance. For example, UE 145, 250 may offset the start of a transmitted uplink subframe from the start of a received downlink subframe using the timing advance. By using a downlink reference time for a cell included in a same timing advance group as the slave SCell to determine a timing advance for uplink communications on the slave SCell, UE 145, 250 may be capable of transmitting uplink communications on the slave SCell even when downlink communications cannot be reliably received on the slave SCell. In this way, UE 145, 250 may improve data throughput.

As indicated above, FIG. 10 is provided as an example. Other examples are possible and may differ from what was described with respect to FIG. 10. For example, the number of component carriers and/or cells shown in FIG. 10 are provided as an example. In some aspects, UE 145, 250 and eNB 110, 210, 230 may use additional component carriers and/or cells to communicate via carrier aggregation. Additionally, or alternatively, the master SCell may provide control information for multiple slave SCells. In this case, the operations described herein in association with a slave SCell may apply to multiple slave SCells for which the master SCell provides control information. Additionally, or alternatively, additional cells, fewer cells, and/or different cells may be included in the timing advance group.

Figure 11:
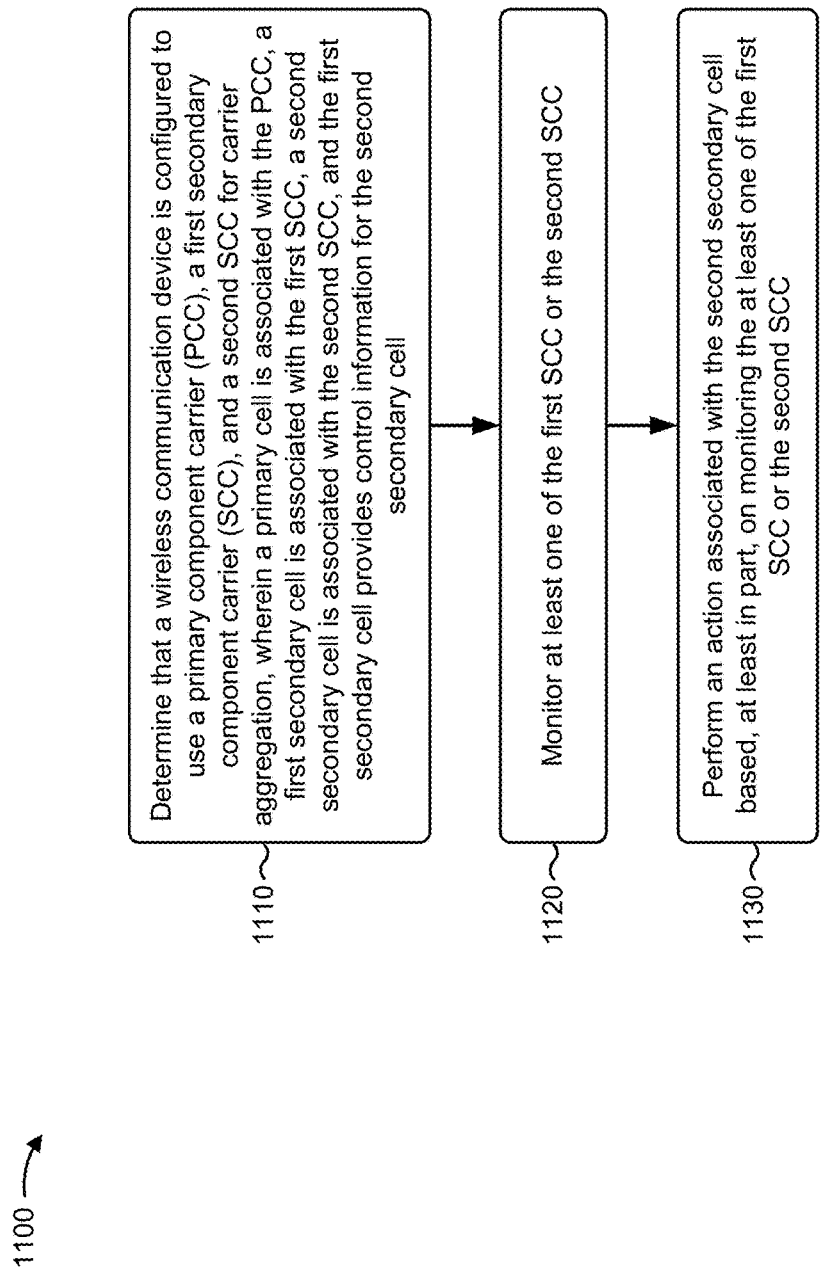
FIG. 11 is a diagram illustrating an example process performed, for example, by a wireless communication device, in accordance with various aspects of the present disclosure.

FIG. 11 is a diagram illustrating an example process 1100 performed, for example, by a wireless communication device, in accordance with various aspects of the present disclosure. Example process 1100 is an example where a wireless communication device (e.g., UE 145, 250) performs virtual radio link monitoring during carrier aggregation and cross-carrier scheduling.

As shown in FIG. 11, in some aspects, process 1100 may include determining that a wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information (e.g., scheduling information) for the second secondary cell (block 1110). In some aspects, the UE 145, 250 may additionally receive control information such as grants (e.g., UL grants) from the PCell. For example, a wireless communication device (e.g., UE 145, 250) may determine that the wireless communication device is configured to use a PCC, a first SCC, and a second SCC for carrier aggregation. The PCC may be associated with a primary cell, the first SCC may be associated with a first secondary cell, and the second SCC may be associated with a second secondary cell. Additionally, or alternatively, the wireless communication device may determine that the wireless communication device is configured for cross-carrier scheduling, where a first cell provides control information for a second cell. For example, the wireless communication device may determine that the first secondary cell provides control information for the second secondary cell.

As shown in FIG. 11, in some aspects, process 1100 may include monitoring at least one of the first SCC or the second SCC (block 1120). For example, the wireless communication device (e.g., UE 145, 250) may monitor the first SCC. Additionally, or alternatively, the wireless communication device may monitor the second SCC.

In some aspects, the wireless communication device may monitor a signal quality associated with the first SCC. In some aspects, the wireless communication device may monitor the first SCC for a radio link failure (e.g., based on monitoring the signal quality, based on detecting that the signal quality associated with the first SCC does not satisfy a threshold, and/or the like). Additionally, or alternatively, the wireless communication device may monitor the first SCC to determine whether the wireless communication device has tuned away (e.g., to monitor for a page on another RAT and/or for a voice call) from the first SCC. Additionally, or alternatively, the wireless communication device may monitor the first SCC to determine whether the first secondary cell has been de-configured or deactivated.

In some aspects, the wireless communication device may monitor a signal quality associated with the second SCC. For example, the wireless communication device may monitor a signal quality associated with a downlink channel of or associated with the second SCC. In some aspects, the wireless communication device may monitor the second SCC for a radio link failure or unsuitability on a downlink channel of the second SCC (e.g., based on monitoring the signal quality, based on determining that the signal quality does not satisfy a threshold, etc.). Additionally, or alternatively, the wireless communication device may monitor the second SCC to determine whether the wireless communication device has tuned away from a downlink channel of the second SCC.

As shown in FIG. 11, in some aspects, process 1100 may include performing an action associated with the second secondary cell based, at least in part, on monitoring the at least one of the first SCC or the second SCC (block 1130). For example, the wireless communication device (e.g., UE 145, 250) may perform an action associated with the second secondary cell based, at least in part, on monitoring at least one of the first SCC and/or the second SCC. In this way, the wireless communication device may perform virtual radio link monitoring for the second secondary cell.

In some aspects, the action may include deactivating the second secondary cell. For example, the wireless communication device may deactivate the second secondary cell based, at least in part, on detecting that the signal quality associated with the first SCC does not satisfy the threshold. Additionally, or alternatively, the wireless communication device may deactivate the second secondary cell based, at least in part, on detecting a radio link failure associated with the first SCC. Additionally, or alternatively, the wireless communication device may deactivate the second secondary cell based, at least in part, on detecting that the wireless communication device has tuned away from the first SCC. Additionally, or alternatively, the wireless communication device may deactivate the second secondary cell based, at least in part, on determining that the first secondary cell has been de-configured or deactivated. In this way, the wireless communication device may conserve battery power, computing resources, and/or network resources by deactivating the second secondary cell when control information for the second secondary cell cannot be reliably received via the first secondary cell.

In some aspects, monitoring the at least one of the first SCC or the second SCC may include monitoring a signal quality associated with the first SCC. In some aspects, the wireless communication device may detect that the signal quality associated with the first SCC does not satisfy a threshold based, at least in part, on monitoring the signal quality associated with the first SCC. In some aspects, the wireless communication device may perform the action associated with the second secondary cell by deactivating the second secondary cell based, at least in part, on detecting that the signal quality associated with the first SCC does not satisfy the threshold.

In some aspects, performing the action associated with the second secondary cell includes deactivating the second secondary cell, periodically activating the second secondary cell to determine channel state information associated with the second SCC, and reporting the channel state information.

In some aspects, performing the action associated with the second secondary cell includes deactivating the second secondary cell during a first time period, activating the second secondary cell during a second time period that occurs after the first time period, determining channel state information associated with the second SCC based, at least in part, on activating the second secondary cell during the second time period, and reporting the channel state information associated with the second SCC.

In some aspects, performing the action associated with the second secondary cell includes deactivating the second secondary cell during a third time period that occurs after the second time period, and reporting the channel state information for a fourth time period that occurs after the second time period without activating the second secondary cell during the fourth time period. In some aspects, the second time period and the fourth time period are consecutive reporting periods.

In some aspects, the wireless communication device may detect that the wireless communication device has tuned away from the first SCC based, at least in part, on monitoring the first SCC. In some aspects, performing the action associated with the second secondary cell includes deactivating the second secondary cell based, at least in part, on detecting that the wireless communication device has tuned away from the first SCC.

In some aspects, the wireless communication device may determine that a tune-away time period, during which the wireless communication device is tuned away from the first SCC, satisfies a threshold, may activate the second secondary cell based, at least in part, on determining that the tune-away time period satisfies the threshold, may determine channel state information associated with the second SCC based, at least in part, on activating the second secondary cell, and may report the channel state information.

In some aspects, the wireless communication device may determine that the first secondary cell has been de-configured or deactivated based, at least in part, on monitoring the first SCC, and may deactivate the first secondary cell based, at least in part, on determining that the first secondary cell has been de-configured or deactivated. In some aspects, performing the action associated with the second secondary cell includes deactivating the second secondary cell based, at least in part, on determining that the first secondary cell has been de-configured or deactivated.

In some aspects, monitoring the at least one of the first SCC or the second SCC includes monitoring a signal quality associated with the second SCC. In some aspects, the wireless communication device may detect that the signal quality associated with the second SCC does not satisfy a threshold based, at least in part, on monitoring the signal quality associated with the second SCC. In some aspects, performing the action associated with the second secondary cell includes determining a downlink reference time associated with another cell other than the second secondary cell based, at least in part, on detecting that the signal quality associated with the second SCC does not satisfy the threshold, determining a timing advance for an uplink channel of the second secondary cell based, at least in part, on the downlink reference time, and transmitting a communication via the uplink channel of the second secondary cell based, at least in part, on the timing advance. In some aspects, the other cell is in a same timing advance group as the second secondary cell.

In some aspects, detecting that the signal quality associated with the second SCC does not satisfy the threshold includes detecting a radio link failure associated with a downlink channel of the second secondary cell. In some aspects, determining the downlink reference time includes determining the downlink reference time based, at least in part, on detecting the radio link failure.

In some aspects, the wireless communication device may detect that the wireless communication device has tuned away from a downlink channel of the second SCC based, at least in part, on monitoring the second SCC. In some aspects, performing the action associated with the second secondary cell includes determining a downlink reference time associated with another cell other than the second secondary cell based, at least in part, on detecting that the wireless communication device has tuned away from the downlink channel, determining a timing advance for an uplink channel of the second secondary cell based, at least in part, on the downlink reference time, and transmitting a communication via the uplink channel of the second secondary cell based, at least in part, on the timing advance.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
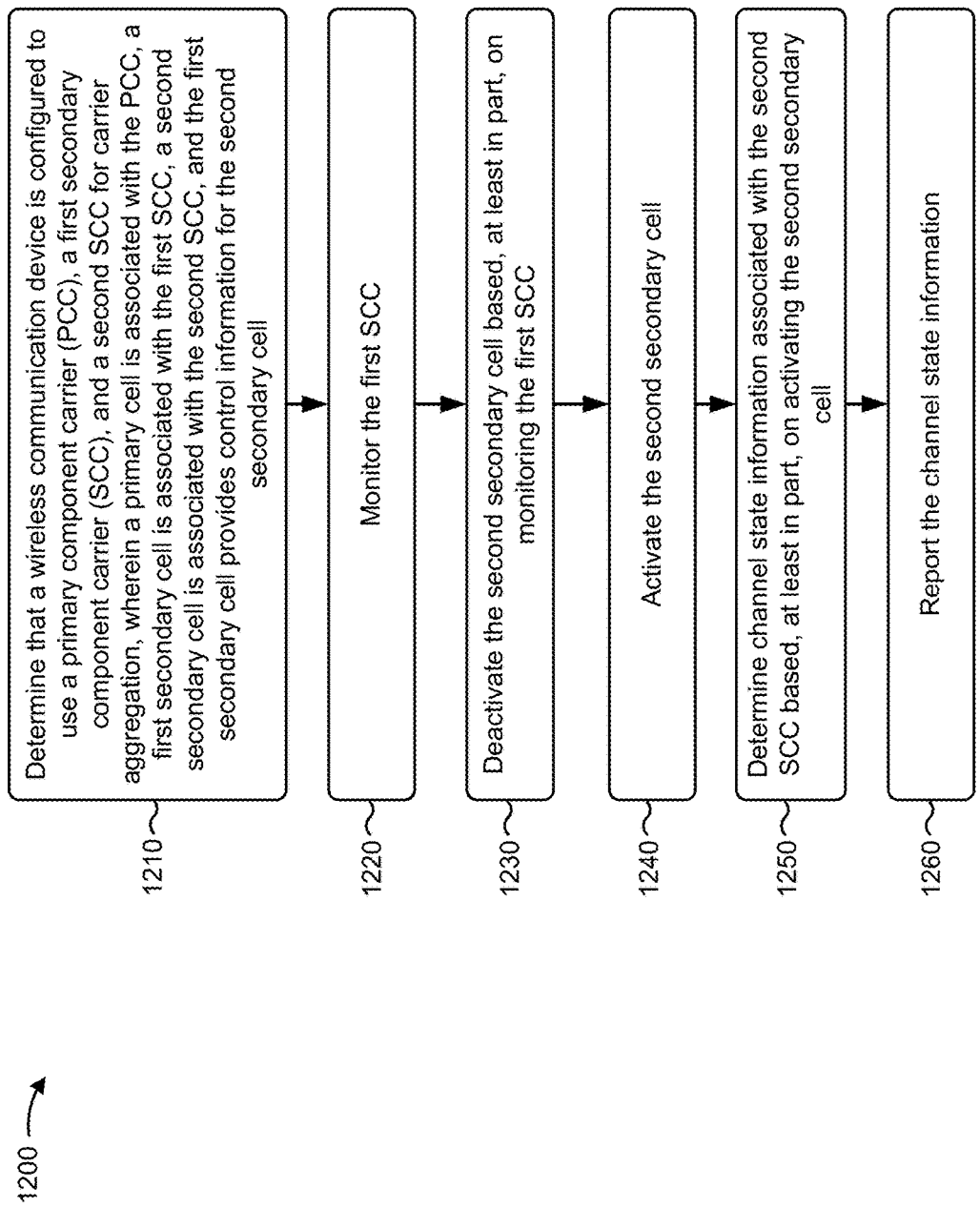
FIG. 12 is a diagram illustrating another example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., UE 145, 250) reports channel state information based, at least in part, on performing virtual radio link monitoring during carrier aggregation and cross-carrier scheduling.

As shown in FIG. 12, in some aspects, process 1200 may include determining that a wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information for the second secondary cell (block 1210). For example, a wireless communication device (e.g., UE 145, 250) may determine that the wireless communication device is configured to use a PCC associated with a primary cell, a first SCC associated with a first secondary cell, and a second SCC associated with a second secondary cell for carrier aggregation and cross-carrier scheduling, as described above in connection with block 1110 of FIG. 11.

As shown in FIG. 12, in some aspects, process 1200 may include monitoring the first SCC (block 1220). For example, the wireless communication device (e.g., UE 145, 250) may monitor the first SCC. In some aspects, the wireless communication device may monitor a signal quality associated with the first SCC to determine whether the signal quality does not satisfy a threshold. Additionally, or alternatively, the wireless communication device may monitor the first SCC for a radio link failure. Additionally, or alternatively, the wireless communication device may monitor the first SCC to determine whether the wireless communication device has tuned away from the first SCC. Additionally, or alternatively, the wireless communication device may monitor the first SCC to determine whether the first secondary cell (e.g., associated with the first SCC) has been de-configured or deactivated.

As shown in FIG. 12, in some aspects, process 1200 may include deactivating the second secondary cell based, at least in part, on monitoring the first SCC (block 1230). For example, the wireless communication device (e.g., UE 145, 250) may deactivate the second secondary cell based, at least in part, on monitoring the first SCC. In some aspects, the wireless communication device may deactivate the second secondary cell based, at least in part, on determining that the signal quality associated with the first SCC does not satisfy the threshold. In some aspects, the wireless communication device may deactivate the second secondary cell based, at least in part, on detecting a radio link failure associated with the first SCC. Additionally, or alternatively, the wireless communication device may deactivate the second secondary cell based, at least in part, on detecting that the wireless communication device has tuned away from the first SCC. Additionally, or alternatively, the wireless communication device may deactivate the second secondary cell based, at least in part, on determining that the first secondary cell has been de-configured or deactivated. Additionally, or alternatively, the wireless communication device may deactivate the first secondary cell based, at least in part, on determining that the first secondary cell has been de-configured or deactivated. In this way, the wireless communication device may conserve battery power, computing resources, and/or network resources by deactivating the second secondary cell when control information for the second secondary cell cannot be reliably received via the first secondary cell.

As shown in FIG. 12, in some aspects, process 1200 may include activating the second secondary cell (block 1240). For example, the wireless communication device (e.g., UE 145, 250) may activate the second secondary cell after deactivating the second secondary cell. In some aspects, the wireless communication device may deactivate the second secondary cell during a first time period, and may activate the second secondary cell during a second time period that occurs after the first time period. In some aspects, the wireless communication device may activate and/or periodically activate the second secondary cell to determine channel state information associated with the second SCC (e.g., corresponding to the second secondary cell).

As shown in FIG. 12, in some aspects, process 1200 may include determining channel state information associated with the second SCC based, at least in part, on activating the second secondary cell (block 1250). For example, the wireless communication device (e.g., UE 145, 250) may determine channel state information associated with the second SCC based, at least in part, on activating the second secondary cell. In some aspects, the wireless communication device may deactivate the second secondary cell during a first time period, may activate the second secondary cell during a second time period that occurs after the first time period, and may determine channel state information associated with the second SCC based, at least in part, on activating the second secondary cell during the second time period.

As shown in FIG. 12, in some aspects, process 1200 may include reporting the channel state information (block 1260). For example, the wireless communication device (e.g., UE 145, 250) may report the channel state information associated with the second SCC. In some aspects, the wireless communication device may deactivate the second secondary cell during a first time period, may activate the second secondary cell during a second time period that occurs after the first time period, may determine channel state information associated with the second SCC based, at least in part, on activating the second secondary cell during the second time period, and may report the channel state information associated with the second SCC (e.g., corresponding to the second secondary cell).

In some aspects, the wireless communication device may deactivate the second secondary cell during a third time period that occurs after the second time period. Additionally, or alternatively, the wireless communication device may report the channel state information, associated with the second SCC, for a fourth time period that occurs after the second time period (and/or the third time period) without activating the second secondary cell during the fourth time period. In some aspects, the second time period and the fourth time period may be consecutive reporting periods.

In some aspects, the wireless communication device may determine that a tune-away time period, during which the wireless communication device is tuned away from the first SCC, satisfies a threshold (e.g., a tune-away threshold). The wireless communication device may activate the second secondary cell based, at least in part, on determining that the tune-away time period satisfies the threshold, may determine channel state information associated with the second SCC based, at least in part, on activating the second secondary cell, and may report the channel state information.

In this way, the wireless communication device may report, to an eNB, channel state information associated with the second SCC, which may include information expected to be received by the eNB. The eNB may use this information to re-configure a network, a carrier aggregation configuration, a cross-carrier scheduling configuration, and/or the like. Furthermore, by periodically activating the second secondary cell to determine and report channel state information, or by reporting previously-determined channel state information without activating the second secondary cell, the wireless communication device may avoid being penalized by the eNB for failing to report the channel state information.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a wireless communication device, in accordance with various aspects of the present disclosure. Example process 1300 is an example where a wireless communication device (e.g., UE 145, 250) uses a downlink reference time from a cell included in a timing advance group to determine a timing advance for uplink communications of another cell included in the timing advance group.

As shown in FIG. 13, in some aspects, process 1300 may include determining that a wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides control information for the second secondary cell (block 1310). For example, a wireless communication device (e.g., UE 145, 250) may determine that the wireless communication device is configured to use a PCC associated with a primary cell, a first SCC associated with a first secondary cell, and a second SCC associated with a second secondary cell for carrier aggregation and cross-carrier scheduling, as described above in connection with block 1110 of FIG. 11.

As shown in FIG. 13, in some aspects, process 1300 may include monitoring the second SCC (block 1320). For example, the wireless communication device (e.g., UE 145, 250) may monitor the second SCC. In some aspects, the wireless communication device may monitor a signal quality associated with the second SCC, and may detect that the signal quality associated with the second SCC does not satisfy a threshold. For example, the wireless communication device may monitor a signal quality associated with a downlink channel of the second SCC, and may detect that the signal quality associated with the downlink channel does not satisfy a threshold. Additionally, or alternatively, the wireless communication device may monitor the second SCC for a radio link failure on a downlink channel of the second SCC. Additionally, or alternatively, the wireless communication device may monitor the second SCC to determine whether the wireless communication device has tuned away from a downlink channel of or associated with the second SCC.

As shown in FIG. 13, in some aspects, process 1300 may include determining a downlink reference time associated with another cell other than the second secondary cell based, at least in part, on monitoring the second SCC (block 1330). For example, the wireless communication device (e.g., UE 145, 250) may determine a downlink reference time associated with another cell other than the second secondary cell (e.g., the primary cell, the first secondary cell, another secondary cell, etc.). In some aspects, the other cell other than the second secondary cell may be a cell in a same timing advance group as the second secondary cell.

As shown in FIG. 13, in some aspects, process 1300 may include determining a timing advance for an uplink channel of the second secondary cell based, at least in part, on the downlink reference time (block 1340). For example, the wireless communication device (e.g., UE 145, 250) may use the downlink reference time, from the other cell other than the second secondary cell, to determine a timing advance for an uplink channel of the second secondary cell.

As shown in FIG. 13, in some aspects, process 1300 may include transmitting a communication via the uplink channel of the second secondary cell based, at least in part, on the timing advance (block 1350). For example, the wireless communication device (e.g., UE 145, 250) may transmit a communication via the uplink channel of the second secondary cell based, at least in part, on the timing advance determined using the downlink reference time from the other cell other than the second secondary cell. In this way, the wireless communication device may continue to communicate via an uplink channel of the second secondary cell, even when the downlink channel of the second secondary cell cannot reliably provide a downlink reference time for computing a timing advance for the uplink channel.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

According to certain aspects, such means may be implemented by processing systems configured to perform the corresponding functions by implementing various algorithms (e.g., in hardware or by executing software instructions) described above.

For example, means for determining, means for monitoring, means for performing, means for detecting, means for activating/deactivating, means for reporting, and means for transmitting may comprise a transmitter/receiver (e.g., the transceiver TX/RX 640), an antenna(s) 645, and/or one or more processors (e.g., RX Processor 650, Controller/Processor 660, and/or TX Processor 680) of the UE 250 illustrated in FIG. 6.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for wireless communication, comprising:
   determining, by a wireless communication device, that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
   monitoring, by the wireless communication device, at least one of the first SCC or the second SCC;

detecting, by the wireless communication device, that a signal quality associated with the first SCC does not satisfy a threshold; and deactivating, by the wireless communication device, the second secondary cell based, at least in part, on detecting that the signal quality associated with the first SCC does not satisfy the threshold.

2. The method of claim 1, further comprising:

periodically activating the second secondary cell to determine channel state information associated with the second SCC; and reporting the channel state information.

3. The method of claim 1, wherein the deactivating, by the wireless communication device, the second secondary cell further comprises:

deactivating the second secondary cell during a first time period;

the method further comprising:

activating the second secondary cell during a second time period that occurs after the first time period;

determining channel state information associated with the second SCC based, at least in part, on activating the second secondary cell during the second time period; and reporting the channel state information associated with the second SCC.

4. The method of claim 3, further comprising:

deactivating the second secondary cell during a third time period that occurs after the second time period; and reporting the channel state information for a fourth time period that occurs after the second time period without activating the second secondary cell during the fourth time period, wherein the second time period and the fourth time period are consecutive reporting periods.

5. The method of claim 1, further comprising:

determining that the first secondary cell has been de-configured or deactivated based, at least in part, on monitoring the first SCC; and deactivating the first secondary cell based, at least in part, on determining that the first secondary cell has been de-configured or deactivated.

6. A method for wireless communication, comprising:

determining, by a wireless communication device, that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;

monitoring, by the wireless communication device, at least one of the first SCC or the second SCC;

detecting that the wireless communication device has tuned away from the first SCC; and deactivating the second secondary cell based, at least in part, on detecting that the wireless communication device has tuned away from the first SCC.

7. The method of claim 6, further comprising:

determining that a tune-away time period, during which the wireless communication device is tuned away from the first SCC, satisfies a threshold;

activating the second secondary cell based, at least in part, on determining that the tune-away time period satisfies the threshold;

determining channel state information associated with the second SCC based, at least in part, on activating the second secondary cell; and reporting the channel state information.

8. A method for wireless communication, comprising:

determining, by a wireless communication device, that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;

monitoring, by the wireless communication device, at least one of the first SCC or the second SCC;

detecting that a signal quality associated with the second SCC does not satisfy a threshold determining a downlink reference time associated with another cell other than the second secondary cell based, at least in part, on detecting that the signal quality associated with the second SCC does not satisfy the threshold;

determining a timing advance for an uplink channel of the second secondary cell based, at least in part, on the downlink reference time; and transmitting a communication via the uplink channel of the second secondary cell based, at least in part, on the timing advance.

9. The method of claim 8, wherein detecting that the signal quality associated with the second SCC does not satisfy the threshold includes detecting a radio link failure associated with a downlink channel of the second secondary cell; and wherein determining the downlink reference time includes determining the downlink reference time based, at least in part, on detecting the radio link failure.

10. The method of claim 8, wherein the other cell is in a same timing advance group as the second secondary cell.

11. A method for wireless communication, comprising:

determining, by a wireless communication device, that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;

monitoring, by the wireless communication device, at least one of the first SCC or the second SCC;

detecting that the wireless communication device has tuned away from a downlink channel associated with the second SCC;

determining a downlink reference time associated with another cell other than the second secondary cell based, at least in part, on detecting that the wireless communication device has tuned away from the downlink channel;

determining a timing advance for an uplink channel of the second secondary cell based, at least in part, on the downlink reference time; and transmitting a communication via the uplink channel of the second secondary cell based, at least in part, on the timing advance.

12. A wireless communication device for wireless communication, comprising:
one or more processors configured to:
determine that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
monitor at least one of the first SCC or the second SCC;
detect that a signal quality associated with the first SCC does not satisfy a threshold; and
deactivate the second secondary cell based, at least in part, on detecting that the signal quality associated with the first SCC does not satisfy the threshold.

13. The wireless communication device of claim 12, wherein the one or more processors are further configured to:
determine that the first secondary cell has been de-configured or deactivated based, at least in part, on monitoring the first SCC; and
deactivate the first secondary cell based, at least in part, on determining that the first secondary cell has been de-configured or deactivated.

14. The wireless communication device of claim 12, wherein the one or more processors are further configured to:
activate the second secondary cell after deactivating the second secondary cell;
determine channel state information associated with the second SCC based, at least in part, on activating the second secondary cell; and
report the channel state information.

15. A wireless communication device for wireless communication, comprising:
one or more processors configured to:
determine that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
monitor at least one of the first SCC or the second SCC;
detect that the wireless communication device has tuned away from the first SCC; and
deactivate the second secondary cell based, at least in part, on detecting that the wireless communication device has tuned away from the first SCC.

16. The wireless communication device of claim 15, wherein the one or more processors are further configured to:
determine a downlink reference time associated with another cell other than the second secondary cell;
determine a timing advance for an uplink channel of the second secondary cell based, at least in part, on the downlink reference time; and
transmit a communication via the uplink channel of the second secondary cell based, at least in part, on the timing advance.

17. A non-transitory computer-readable medium storing instructions for wireless communication, that, when executed by one or more processors of a wireless communication device, cause the wireless communication device to:
determine that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
monitor at least one of the first SCC or the second SCC;
detect that a signal quality associated with the first SCC does not satisfy a threshold; and
deactivate the second secondary cell based, at least in part, on detecting that the signal quality associated with the first SCC does not satisfy the threshold.

18. The non-transitory computer-readable medium of claim 17, wherein the one or more instructions further cause the one or more processors wireless communication device to:
determine that the first secondary cell has been de-configured based, at least in part, on monitoring the first SCC; and
deactivate the first secondary cell based, at least in part, on determining that the first secondary cell has been de-configured.

19. The non-transitory computer-readable medium of claim 17, wherein the one or more instructions further cause the wireless communication device to:
activate the second secondary cell after deactivating the second secondary cell;
determine channel state information associated with the second SCC based, at least in part, on activating the second secondary cell; and
report the channel state information.

20. A non-transitory computer-readable medium storing instructions for wireless communication that, when executed by one or more processors of a wireless communication device, cause the wireless communication device to:
determine that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
monitor at least one of the first SCC or the second SCC;
detect that the wireless communication device has tuned away from the first SCC; and
deactivate the second secondary cell based, at least in part, on detecting that the wireless communication device has tuned away from the first SCC.

21. The non-transitory computer-readable medium of claim 20, wherein the one or more instructions further cause the wireless communication device to:
determine a downlink reference time associated with at least one of the primary cell or the first secondary cell;
determine a timing advance for an uplink channel of the second secondary cell based, at least in part, on the downlink reference time; and
transmit a communication via the uplink channel of the second secondary cell based, at least in part, on the timing advance.

22. An apparatus for wireless communication, comprising:
- means for determining that the apparatus is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
- means for monitoring at least one of the first SCC or the second SCC;
- means for detecting, by the wireless communication device, that a signal quality associated with the first SCC does not satisfy a threshold based; and
- means for deactivating, by the wireless communication device, the second secondary cell based, at least in part, on detecting that the signal quality associated with the first SCC does not satisfy the threshold.

23. The apparatus of claim 22, further comprising:
- means for determining that the first secondary cell has been de-configured based, at least in part, on monitoring the first SCC; and
- means for deactivating the first secondary cell based, at least in part, on determining that the first secondary cell has been de-configured.

24. The apparatus of claim 22, wherein the means for performing the action comprises:
- means for activating the second secondary cell after deactivating the second secondary cell;
- means for determining channel state information associated with the second SCC based, at least in part, on activating the second secondary cell; and
- means for reporting the channel state information.

25. An apparatus for wireless communication, comprising:
- means for determining that the wireless communication device is configured to use a primary component carrier (PCC), a first secondary component carrier (SCC), and a second SCC for carrier aggregation, wherein a primary cell is associated with the PCC, a first secondary cell is associated with the first SCC, a second secondary cell is associated with the second SCC, and the first secondary cell provides scheduling information for the second secondary cell;
- means for monitoring at least one of the first SCC or the second SCC;
- means for detecting that the apparatus has tuned away from the first SCC; and
- means for deactivating the second secondary cell based, at least in part, on detecting that the apparatus has tuned away from the first SCC.

* * * * *